US 8,648,912 B2

(12) United States Patent
Matsuda et al.

(10) Patent No.: US 8,648,912 B2
(45) Date of Patent: Feb. 11, 2014

(54) VEHICLE PERIPHERY MONITORING APPARATUS (75) Inventors: Kodai Matsuda, Saitama (JP); Makoto Aimura, Saitama (JP); Izumi Takatsudo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 314 days.

(21) Appl. No.: 13/123,997

(22) PCT Filed: Oct. 8, 2009

(86) PCT No.: PCT/JP2009/005258
§ 371 (c)(1),
(2), (4) Date: Jun. 8, 2011

(87) PCT Pub. No.: WO2010/047054
PCT Pub. Date: Apr. 29, 2010

(65) Prior Publication Data
US 2011/0234804 A1    Sep. 29, 2011

(30) Foreign Application Priority Data

Oct. 20, 2008  (JP) ................................. 2008-269636

(51) Int. Cl.
*H04N 7/18*  (2006.01)
(52) U.S. Cl.
USPC ........... 348/148; 348/143; 348/149; 348/153; 382/104; 382/190; 382/194; 382/195; 382/199; 382/203; 382/209; 382/214; 382/217; 382/219; 382/220; 382/228; 701/1; 701/29.6; 701/36; 701/41
(58) Field of Classification Search
USPC .......... 348/148, 143, 149, 153; 382/104, 190, 382/194, 195, 199, 203, 209, 214, 217, 219, 382/220, 228; 701/1, 29.6, 36, 41
See application file for complete search history.

(56) References Cited

U.S. PATENT DOCUMENTS

| 6,650,778 | B1 * | 11/2003 | Matsugu et al. ............... 382/209 |
| 2007/0165967 | A1 * | 7/2007 | Ando et al. .................... 382/291 |
| 2008/0036576 | A1 * | 2/2008 | Stein et al. .................. 340/425.5 |

FOREIGN PATENT DOCUMENTS

| JP | 02-026490 A | 1/1990 |
| JP | 2000-097963 A | 4/2000 |

(Continued)

OTHER PUBLICATIONS

Shimomura. JP2006-101384 JPO Full Text and Abstract Translation. Apr. 2006.*

(Continued)

*Primary Examiner* — Christopher S Kelley
*Assistant Examiner* — Zhihan Zhou
(74) *Attorney, Agent, or Firm* — Carrier Blackman & Associates, P.C.; Joseph P. Carrier; Jeffrey T. Gedeon (57) ABSTRACT Bicycles present before a vehicle are identified. A picked-up image having intensity values that are in accordance with the temperatures of objects is acquired to extract image regions having intensity values representative of higher temperatures than a background. An object, which includes a pair of first object portions (legs) and a second object portion (a tire), would be identified as a bicycle if the pair of first object portions, which have greater dimensions in length in the vertical direction than in width in the horizontal direction and the distance between which is less than a predetermined value in the horizontal direction, are detected from the extracted image regions and further if the second object portion, which has a different intensity value from any one of the first object portions and also has a length greater than a predetermined value in the vertical direction, is existent between the pair of first object portions.

18 Claims, 9 Drawing Sheets (56) References Cited

FOREIGN PATENT DOCUMENTS

| | | |
|---|---|---|
| JP | 2001-006096 A | 1/2001 |
| JP | 2003-216949 A | 7/2003 |
| JP | 2003-226211 A | 8/2003 |
| JP | 2005-165422 A | 6/2005 |
| JP | 2006-185434 A | 7/2006 |
| JP | 2008-046947 A | 2/2008 |
| JP | 2008-090748 A | 4/2008 |

OTHER PUBLICATIONS

Hata et al. JP2007-317025 JPO Full Text and Abstract Translation. Dec. 2007.*
Sasajima. JP2008-046947 JPO Full Text and Abstract Translation. Feb. 2008.*
Miyashita. JP2008-090748 JPO Full Text and Abstract Translation. Apr. 2008.*
Hui Sun et al., "A Multi-stage Classifier Based Algorithm of Pedestrian Detection in Night with a Near Infrared Camera in a Moving Car", Image and Graphics, 2004, Proceedings, Third International Conference on Hong Kong, China Dec. 18-20, 2004, Piscataway, NJ, USA, IEEE, pp. 120-123.
Xu Y W et al., "Optical Camera Based Pedestrian Detection in Rainy or Snowy Weather", Jan. 1, 2006, Fuzzy Systems and Knowledge Discovery Lecture Notes in Computer Science; Lecture Notes in Artificial Intelligence; LNCS, Springer, Berlin, DE, pp. 1182-1191.

* cited by examiner

VEHICLE PERIPHERY MONITORING APPARATUS

TECHNICAL FIELD

The present invention relates to an apparatus for monitoring periphery of a vehicle so as to recognize a bicycle present around the vehicle.

BACKGROUND ART

Conventionally, a technique for capturing an image of periphery of a vehicle by one or more cameras to recognize a physical object present around the vehicle has been proposed. The patent document 1 below discloses a technique for recognizing a physical object such as a bicycle present in front of a subject vehicle and identifying a direction of a sight line of a driver of the bicycle. When the sight line of the driver is not directed to the vehicle, a warning is issued.
Patent Document 1: Japanese Patent Publication Laid-Open (JPA) No. 2005-165422

DISCLOSURE OF THE INVENTION

Problem to be Solved by the Invention

An object that possibly makes a contact with a vehicle includes not only a pedestrian but also a bicycle. A bicycle often travels on a roadway, and hence its presence may influence the traveling of a vehicle. Therefore, it is desirable that a bicycle is distinguished from other objects to notify a driver of it. In the above patent document, although a bicycle is recognized as an object, its specific recognition technique is not disclosed.

Therefore, one object of the present invention is to provide a technique for determining a bicycle in a captured image.

Means for Solving Problem

According to one aspect of the present invention, a vehicle periphery monitoring apparatus, mounted on a vehicle, for recognizing a bicycle operated by a driver around the vehicle, captures an image of periphery of the vehicle to obtain a captured image having luminance values according to temperatures of an object. From the captured image, an image region having luminance values indicating temperatures higher than a background temperature by a predetermined value is extracted. A pair of first object portions each having a length in a vertical direction greater than a width in a horizontal direction is detected from the extracted image region. A distance between one of the first object portions and the other of the first object portions is less than a predetermined value in the horizontal direction. If a second object portion having luminance values different from the pair of the first object portions and having a length in the vertical direction greater than a predetermined value exists between the pair of the first objection portions, an object including the first objection portions and the second object portion is determined as a bicycle.

According to the present invention, a bicycle can be determined based on a shape and placement of an object in a captured image. That is, if the above pair of the first object portions is detected and the above second object portion exists between the pair of the first object portions, it indicates that both legs are detected and a tire portion of the bicycle exists between the both legs, and hence the bicycle can be determined. Thus, a driver of the vehicle is caused to recognize a presence of a bicycle around the vehicle. Furthermore, because a bicycle is determined based on a shape and placement, a bicycle can be determined using a single captured image. It is not required to track a plurality of captured images in time. Time and load of image processing required for the determination of a bicycle can be reduced.

Other features and advantages of the present invention will be apparent from the following detailed description of the present invention and the accompanying drawings.

DETAILED DESCRIPTION OF THE INVENTION

Preferred embodiments of the present invention will be described referring to the attached drawings.

Figure 1:
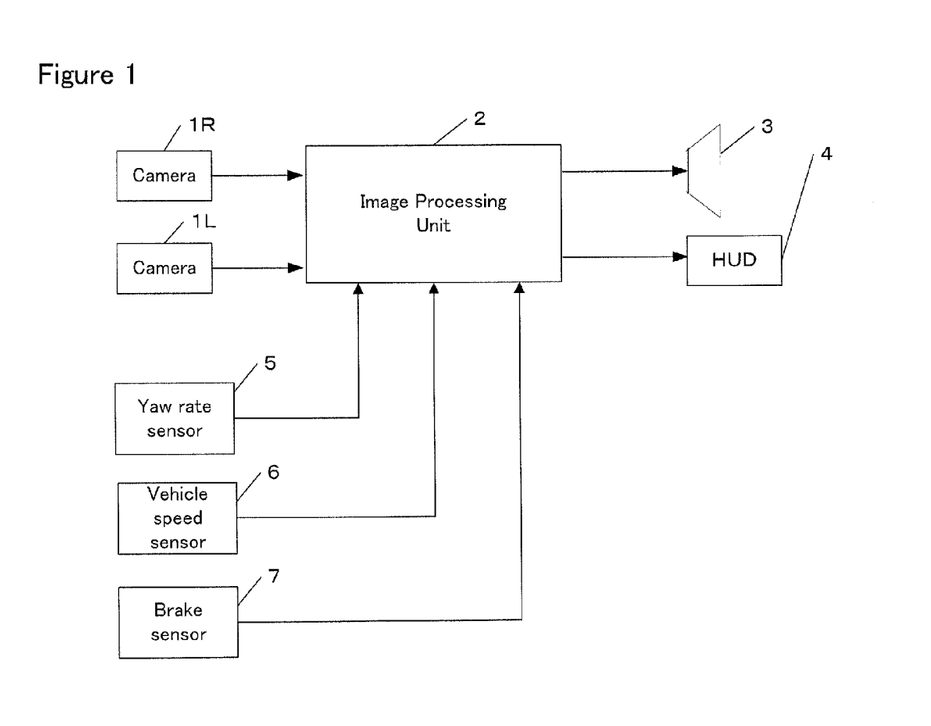
FIG. 1 is a block diagram showing a structure of a periphery monitoring apparatus in accordance with one embodiment of the present invention.

FIG. 1 is a block diagram showing a structure of a periphery monitoring apparatus of a vehicle in accordance with one embodiment of the present invention. The apparatus is mounted on the vehicle and comprises two infrared cameras 1R, 1L capable of detecting far-infrared rays, a yaw rate sensor 5 for detecting a yaw rate of the vehicle, a vehicle speed sensor 6 for detecting traveling speed (vehicle speed) VCAR of the vehicle, a brake sensor 7 for detecting an operation amount of a brake of the vehicle, an image processing unit 2 for detecting an object in front of the vehicle based on image data obtained by the cameras 1R, 1L, a speaker 3 for issuing a warning with voice based on the detected result, and a head-up display (hereinafter referred to as a "HUD") 4 for displaying an image obtained by the camera 1R or 1L and outputting a display to cause a driver of the vehicle to recognize an object determined as having a high possibility of collision against the vehicle.

Figure 2:
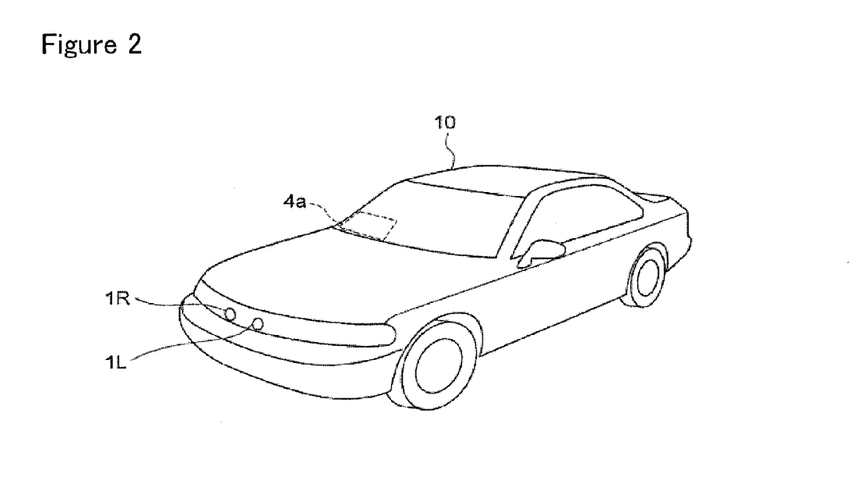
FIG. 2 is a diagram for explaining attachment positions of cameras in accordance with one embodiment of the present invention.

As shown in FIG. 2, the cameras 1R, 1L are arranged in a front portion of the vehicle 10 at locations symmetric with respect to the longitudinal central axis of the vehicle 10, and rigidly fixed to the vehicle such that the two cameras 1R, 1L have optical axes in parallel with each other and equal heights from a road surface. The infrared cameras 1R, 1L have a characteristic that the output signal level becomes higher (that is, the luminance in a captured image increases) as the temperature of the object becomes higher.

The image processing unit 2 includes an A/D converter circuit for converting input analog signals to digital signals, an image memory for storing digitized image signals, a CPU (central processing unit) for carrying out arithmetic operations, a RAM (Random access memory) used by the CPU for storing data being processed in the arithmetic operations, a ROM (Read Only memory) storing programs executed by the CPU and data to be used by the programs (including tables and maps), and an output circuit for outputting driving signals to the speaker 3, display signals to the HUD 4, and the like. Output signals from the cameras 1R, 1L and the sensors 5 to 7 are converted to digital signals and input into the CPU. As shown in FIG. 2, the HUD 4 is arranged such that a screen 4a thereof is displayed in a front window at a location ahead of the driver. Thus, the driver can view the screen displayed on the HUD 4.

Figure 3:
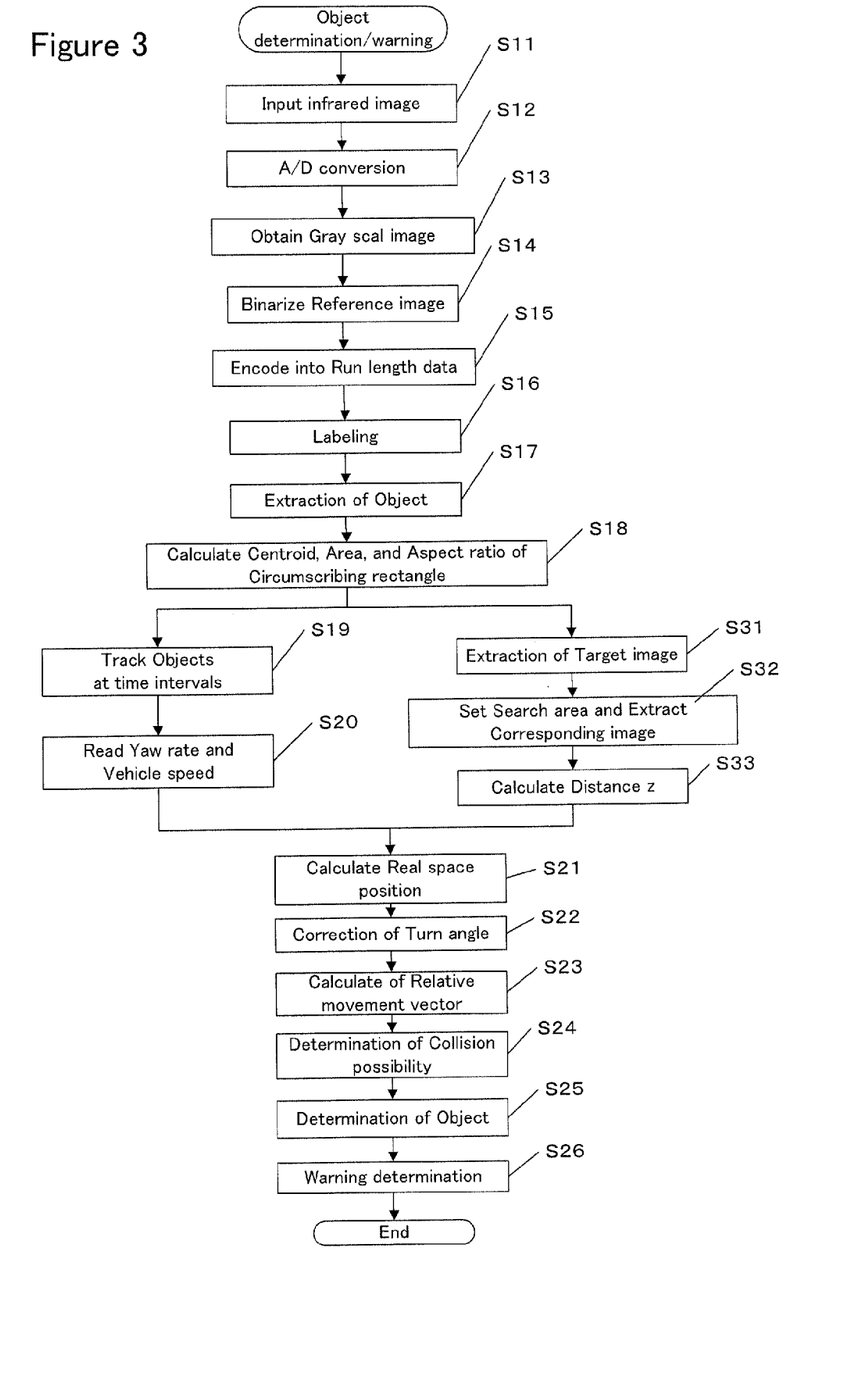
FIG. 3 is a flowchart showing a process by an image processing unit in accordance with one embodiment of the present invention.

FIG. 3 is a flowchart of a process executed by the image processing unit 2. This process is executed at predetermined time intervals.

In steps S11 through S13, output signals from the cameras 1R, 1L (that is, data of images captured by the cameras 1R, 1L) are received and A/D converted. The resulting digital data is stored in the image memory. Data of the images thus stored are gray scale images having higher luminance values (luminance values closer to white) as the temperature of an object is higher with respect to the temperature of the background. In the right image captured by the camera 1R and the left image captured by the camera 1L, an identical object is displayed as images at respective locations horizontally displaced from each other, so that it is possible to calculate a distance from the vehicle to the object based on the displacement (parallax).

In step S14, the right image is set to a reference image (alternatively, the left image may be set to the reference image), and its image signal is binarized. More specifically, an area having a luminance value equal to or higher than a luminance threshold value ITH, which is determined in advance through a simulation or the like, is set to "1" (white) and an area having a luminance value lower than the threshold value ITH is set to "0" (black). Here, the threshold value ITH is set to a value that differentiates an object such as a human being and animal having a temperature higher than a predetermined value from the background (including a road surface). Thus, an object having a higher temperature is extracted as a white area.

Figure 4A:
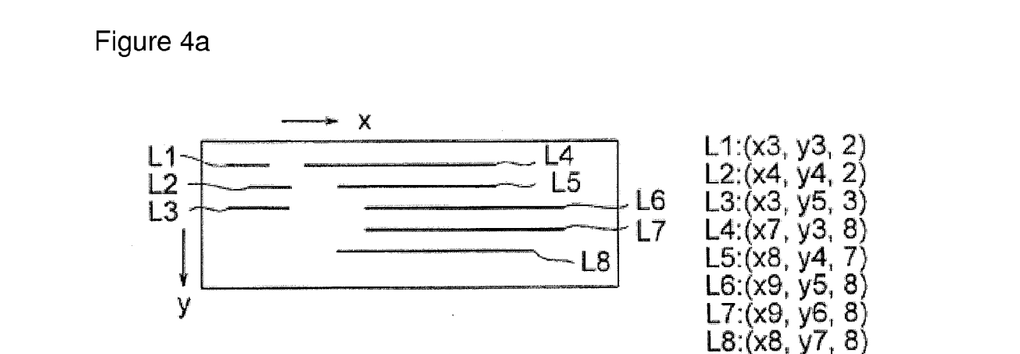
FIG. 4 is a diagram for explaining a converting process to run-length data and labeling process in accordance with one embodiment of the present invention.

In step S15, the binarized image data is converted to run length data. FIG. 4 is a diagram for explaining this process. In FIG. 4(a), areas set to white by the binarization are shown by lines L1 through L8. Each of the lines L1 through L8 has a width of one pixel in the y direction. Although the lines L1 through Lm are actually arranged side by side without any gaps in the y direction, they are shown as separate lines spaced from each other for clarity of description. Further, the lines L1 through L8 have respective length of two pixels, two pixels, three pixel, eight pixels, seven pixels, eight pixels, eight pixels, and eight pixels in the x direction. The run length data represents each of the lines L1 through L8 by the coordinates of the starting point (point of the left end) of the line and the length (the number of pixels) of the line from the starting point to the ending point (point of the right end). For example, the line L3 is formed of three pixels (x3, y5), (x4, y5), and (x5, y5), and hence represented by the run length data (x3, y5, 3).

Figure 4B:
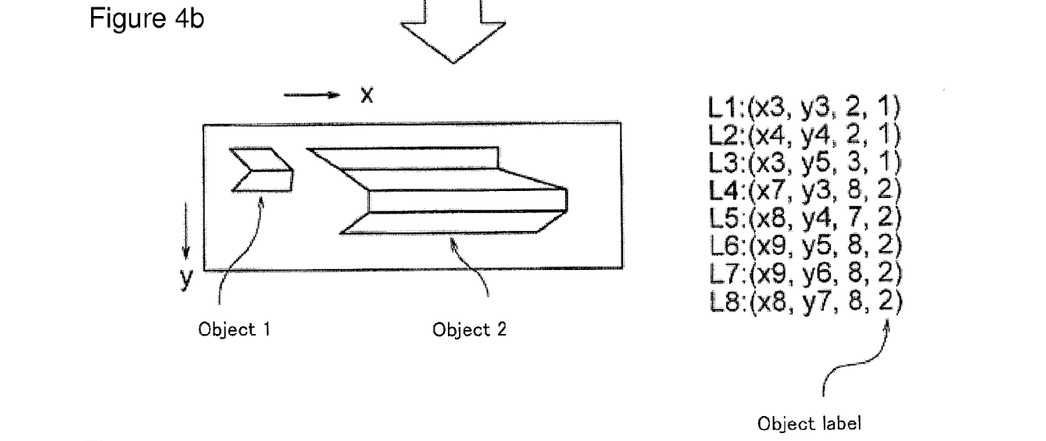

In steps S16 and S17, a process for extracting an object by labeling the object is performed as shown in FIG. 4(b). That is, among the lines L1 through L8 encoded into the run length data, the lines L1 through L3 overlapping in the y direction are regarded as one object 1, and the lines L4 through L8 overlapping in the y direction are regarded as one object 2. Object labels 1 and 2 are added to the run length data of the objects 1 and 2, respectively.

Figure 4C:
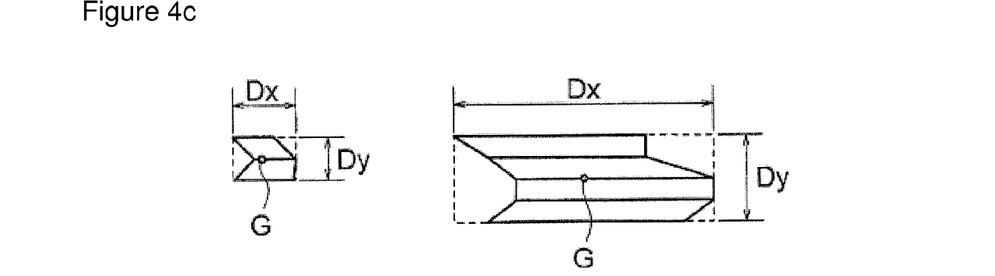

In step S18, as shown in FIG. 4(c), the centroid G of the extracted object, the area S of the extracted object, and the aspect ratio ASPECT of a rectangle circumscribing the extracted object, indicated by broken lines, are calculated. The area S is calculated by integrating the lengths of the run length data of an identical object. The coordinates of the centroid G are calculated as the x coordinate of a line equally dividing the area S along the x direction into halves, and the y coordinate of a line equally dividing the area S along the y direction into halves. The aspect ratio ASPECT is calculated as Dy/Dx which is a ratio of the length Dy in the y direction to the length Dx in the x direction of the rectangle. The position of the centroid of the circumscribing rectangle may be used in place of that of the centroid G of the extracted object.

In step S19, each object is tracked at time intervals, that is, identification or recognition of an identical object is carried out in a predetermined sampling cycle. The sampling cycle may be the same as a cycle in which the process of FIG. 3 is performed. More specifically, a time obtained by discretizing time t having an analog amount by the sampling cycle is represented by k. Assuming that an object "A" is extracted at time k, an identification is determined between the object A and an object B extracted at next sampling time (k+1). Such identification can be made according to predetermined conditions. For example, when 1) a difference of the X and Y coordinates of the position of the centroid G in the image between the objects A and B is less than a predetermined allowable value, 2) a ratio of the area in the image of the object B with respect to the area in the image of the object A is less than a predetermined allowable value, and 3) a ratio of the aspect of the circumscribing rectangle of the object B with respect to the aspect of the circumscribing rectangle of the object A is less than a predetermined allowable value, the objects A and B are determined to be identical.

Thus, in each sampling cycle, for each extracted object, the position (the position coordinates of the centroid G, in this example) of the object is stored in the memory as time series data together with the added label.

The above processes in steps S14 through S19 are performed for the binarized reference image (the right image, in this example).

In step S20, the vehicle speed VCAR detected by the vehicle speed sensor 6 and the yaw rate YR detected by the yaw rate sensor 5 are read. The yaw rate YR is integrated over time to calculate the angle θr of turn (which is described later) of the vehicle 10.

On the other hand, in steps S31 through S33, a process for calculating a distance z to an object from the vehicle 10 is performed in parallel with a process of the steps S19 and S20. Because this calculation takes a longer time period than the process of steps S19 and S20, this calculation may be performed in a cycle longer than that of the steps S19 and S20 (for example, this calculation may be performed in a cycle having a length of approximately three times the cycle length of the process from the step S11 to step S20).

In step S31, One of objects tracked in the binarized image of the reference image (right image, in this example) is selected as a target image R1 (an image area surrounded by a circumscribing rectangle is set to a target image, in this example). In step S32, an image of an object (hereinafter referred to as a corresponding image) identical to the target image R1 is searched in the left image. More specifically, a correlation operation between the target image R1 and the left image is performed. The correlation operation is conducted according to the following equation (1). This correlation operation is performed using the gray scale images, not the binary images.

$$C(a, b) = \sum_{n=0}^{N-1}\sum_{m=0}^{M-1} |IL(a+m-M, b+n-N) - IR(m, n)| \quad (1)$$

Here, the target image R1 has the number of pixels of M×N. IR(m, n) is a luminance value of a position shown by the coordinates (m, n) in the target image R1. IL(a+m−M, b+n−N) is a luminance value of a position shown by coordinates (m, n) in a local area having the same shape as the target image R1 with a reference point set to predetermined coordinates (a, b) in the left image. A position in the corresponding image is identified by determining a position that minimizes the total sum value C(a, b) of the luminance differences while changing the coordinates (a, b) of the reference point.

Alternatively, an area to be searched may be previously set in the left image. The correlation operation may be performed between the target image R1 and the area thus set.

In step S33, a distance dR (the number of pixels) between the centroid position of the target image R1 and a center line LCTR of the captured image (which divides the captured image into halves in the x direction) is determined. A distance dL (the number of pixels) between the centroid position of the corresponding image and the center line LCTR is determined. The distance z to the object from the vehicle 10 is calculated by applying the distances dR and dL in the equation (2).

$$z = \frac{B \times F}{(dL+dR) \times p} = \frac{B \times F}{\Delta d \times p} \quad (2)$$

Here, B indicates the length of a base line, that is, a distance in the x direction (horizontal direction) between the center position of an imaging element of the camera 1R and the center position of an imaging element of the camera 1L (i.e. distance between the optical axes of the respective cameras). F indicates the focal distance of lenses 12R, 12L of the cameras 1R and 1L. p indicates a space interval between pixels in the imaging elements 11R, 11L. Δd(=dR+dL) indicates the amount of parallax.

Figure 5A:
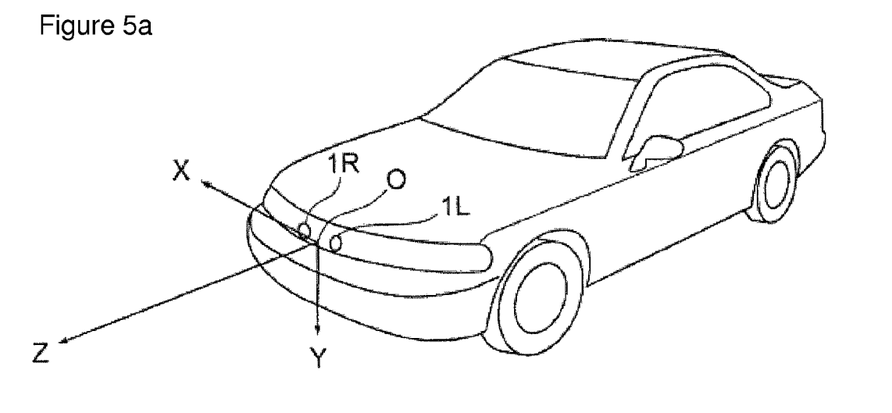
FIG. 5 is a diagram for showing a real space coordinate system and an image coordinate system in accordance with one embodiment of the present invention.

In step S21, the coordinates (x, y) of the object in the image (as described above, the position of the centroid G in this example) and the distance z calculated by the equation (2) are applied to the equation (3) to convert into real space coordinates (X, Y, Z). Here, the real space coordinates (X, Y, Z) are represented in a coordinate system in which the position of a middle point (position fixed on the vehicle 10) of the mounting positions at which the cameras 1R and 1L are mounted is set to an origin O, as shown in FIG. 5(a). As shown in the figure, the X axis is defined in the vehicle width direction of the vehicle 10, the Y axis is defined in the vehicle height direction of the vehicle 10, and the Z axis is defined in the travel direction of the vehicle 10. Coordinates in the image are represented in a coordinate system in which the center of the image is set to the origin, as shown in FIG. 5(a). The x axis is defined in the horizontal direction, the y axis is defined in the vertical direction.

$$\begin{bmatrix} X \\ Y \\ Z \end{bmatrix} = \begin{bmatrix} xc \times z/f \\ yc \times z/f \\ z \end{bmatrix} \quad (3)$$

$$f = F/p$$

Here, (xc, yc) is obtained by converting the coordinates (x, y) in the right image to coordinates in a virtual image where the origin O of the real space coincides with the origin of the image based on a relative positional relationship between the mounting position of the camera 1R and the origin O of the real space coordinate system. f indicates a ratio between the focal distance F and the pixel-to-pixel space interval p.

In step S22, a turn angle correction is made for correcting a positional displacement in the image due to turning of the vehicle 10. If the vehicle 10 makes a turn by the angle θr in the leftward direction during a time period from time k to time (k+1), an image obtained by the camera is displaced by Δx in the x direction (positive direction), Therefore, this is corrected.

More specifically, a corrected coordinates (Xr, Yr, Zr) are calculated by applying the real space coordinates (X, Y, Z) to the equation (4). The real space position data (Xr, Yr, Zr) thus calculated is stored for each object in time series. In the following description, the corrected coordinates are denoted as coordinates (X, Y, Z).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \quad (4)$$

In step S23, for an identical object, an approximate straight line LMV corresponding to a relative movement vector of the object with respect to the vehicle 10 is determined from N real space position data items (for example, N is a number equal to or close to 10), that is, from time series data which are obtained during a time period ΔT after the turn angle correction. More specifically, assuming that a direction vector indicative of the direction of the approximate straight line LMV is represented by L=(lx, ly, lz) (|L|=1), a straight line represented by the equation (5) is determined.

$$X = u \cdot lx + Xav \quad (5)$$
$$Y = u \cdot ly + Yav$$
$$Z = u \cdot lz + Zav$$
$$Xav = \sum_{j=0}^{N-1} X(j)/N$$
$$Yav = \sum_{j=0}^{N-1} Y(j)/N$$

$$Zav = \sum_{j=0}^{N-1} Z(j)/N$$

Here, u is a parameter capable of having an arbitrary value. Xav, Yav and Zav indicate the average value of X coordinates, the average of Y coordinates, and the average value of Z coordinates, respectively, of series of real space position data. By eliminating the parameter u from the equation (5), the following equation (5a) is obtained.

$$(X-Xav)/lx=(Y-Yav)/ly=(Z-Zav)/lz \quad (5a)$$

Figure 6:
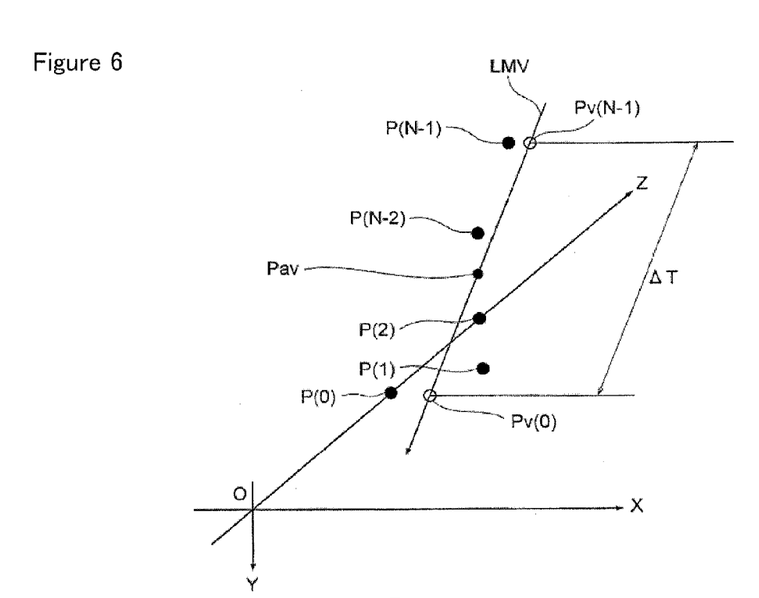
FIG. 6 is a diagram for explaining a technique for calculating a relative movement vector in accordance with one embodiment of the present invention.

FIG. 6 is a diagram for explaining the approximate straight line LMV. P(0), P(1), P(2), . . . , P(N−2), P(N−1) indicate time series data after the turn angle correction. The approximate straight line LMV is determined as a straight line that extends through the average position coordinates Pav (=(Xav, Yav, Zav)) of the time series data and minimizes an average value of the squares of respective distances between the line and the data points. Here, as to a numeric value in a parenthesis added to each P indicating the coordinates of each data point, the larger the numeric value is, the older the data item having the numeric value is. For example, P(0) indicates the latest position coordinates. P(1) indicates position coordinates obtained one sampling cycle before. P(2) indicates position coordinates obtained two sampling cycles before. The same applies to X(j), Y(j), Z(j) and the like referred to hereinafter. A detail of a technique for calculating the approximate straight line LMV is described in Japanese patent publication laid-open No. 2001-6096.

Next, the latest position coordinates P(0)=(X(0), Y(0), Z(0)) and the position coordinates P(N−1)=(X(N−1), Y(N−1), Z(N−1) obtained (N−1) sampling cycles before (that is, time period ΔT before) are corrected to positions on the approximate straight line LMV. More specifically, by applying the Z coordinates Z(0) and Z(N−1) to the above equation (5a), that is, by using the equation (6), corrected position coordinates Pv(0)=(Xv(0), Yv(0), Zv(0)) and Pv(N−1)=(Xv(N−1), Yv(N−1), Zv(N−1)) are determined.

$$Xv(j) = (Z(j) - Zav) \times \frac{lx}{lz} + Xav \quad (6)$$

$$Yv(j) = (Z(j) - Zav) \times \frac{ly}{lz} + Yav$$

$$Zv(j) = Z(j)$$

$$j = 0, N-1$$

A vector extending from the position coordinates Pv(N−1) to Pv(0) calculated by the equation (6) is calculated as the relative movement vector.

Thus, the relative movement vector is determined by calculating the approximate straight line LMV that approximates the locus of the relative movement of an object to the vehicle 10 from a plurality of (N) data items during a monitoring time period ΔT. This makes it possible to reduce an influence of position detection errors, and more accurately predict the possibility of collision against an object in advance.

Referring back to FIG. 3, in step S24, a collision possibility determination process for determining the possibility of collision against an object is performed. In this process, a relative speed Vs in the z direction is calculated by the equation (7) and then it is determined whether the equations (8) and (9) are met.

$$Vs=(Zv(N-1)-Zv(0))/\Delta T \quad (7)$$

$$Zv(0)/Vs \leq T \quad (8)$$

$$|Yv(0)| \leq H \quad (9)$$

Here, Zv(0) is the latest detected distance value (although v is added to indicate that it represents a value of a data item corrected by using the approximate straight line LMV, the Z coordinate itself has the same value as it has before the correction). Zv(N−1) is a detected distance value the time period ΔT before. T is a margin time, which is provided for enabling the possibility of collision to be determined the time period T before from a predicted collision time. For example, T is set to a time period within a range of two to five seconds. H is a predetermined height for defining a range in the Y direction, that is, in the direction of height, which is set to, for example, a height approximately two times that of the vehicle 10.

Figure 7:
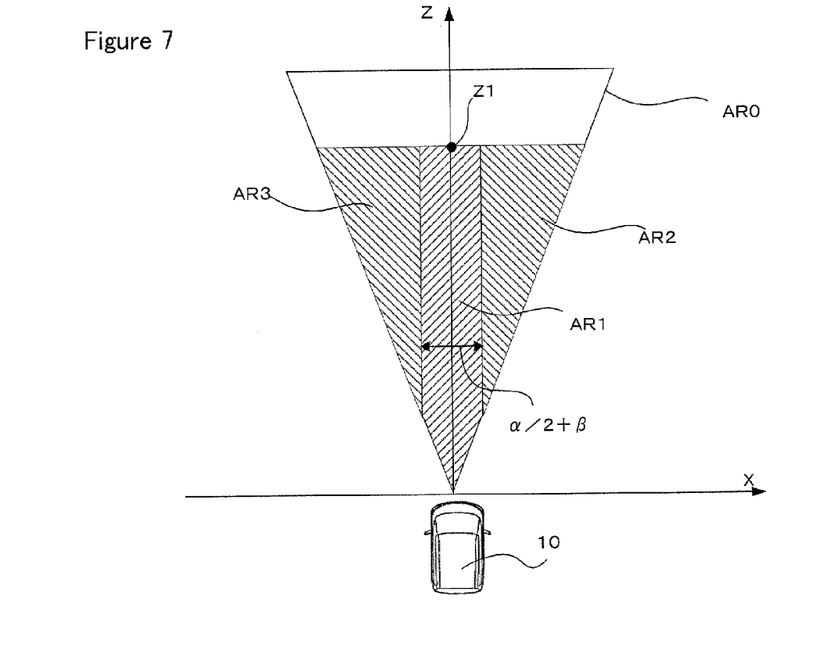
FIG. 7 is a diagram for showing divisional areas in front of a vehicle in accordance with one embodiment of the present invention.

If the equations (8) and (9) are met, a closing object determination is performed. In the closing object determination, it is determined whether an object is present in a predetermined closing determination area (that is, whether the latest position Pv(0) is present in the closing determination area). If so, the possibility of collision between the object and the vehicle 10 is determined. Here, referring to FIG. 7, an area AR0 that can be monitored by the cameras 1R and 1L is shown. The closing determination area AR1 is an area corresponding to a range having the width α of the vehicle 10 and allowances β (for example, 50 to 100 cm) provided on opposite sides of the width α of the vehicle, in other word, a range having the width of (α/2+β) with respect to the longitudinal center axis of the vehicle 10. If an object continues to exist in this area, there is a high possibility of collision against the vehicle.

If it is determined that an object is not present in the closing determination area AR1, an incoming object determination process is performed, in which it is determined whether there is a possibility of collision against the vehicle 10 by an object in the incoming determination area moving into the closing determination area AR1. If the result of this determination is affirmative, it is determined that there is a possibility of collision between the object and the vehicle 10. Referring again to FIG. 7, the incoming determination areas AR2 and AR3 have the X coordinates whose absolute values are larger than those in the closing determination area AR1 (areas laterally outward of the closing determination area AR1). These areas AR1 through AR3 have the predetermined distance Z1=Vs× ·T in the Z direction, and the predetermined height H in the Y direction. This incoming determination process may be implemented by any appropriate technique, which is described in, for example, Japanese patent publication laid-open No. 2001-6096.

Thus, if an object is determined as having a possibility of collision against the vehicle 10, the process proceeds to step S25, in which a process for determining the object is performed. If the object is determined as an object to be paid attention, the process proceeds to step S26, in which a warning determination process is performed. In the warning determination process, it is determined whether a warning is actually issued. If the result of this determination is affirmative, the warning is issued.

The present invention relates to a technique for determining a bicycle existing in front of a vehicle. This determination process for a bicycle is performed in step S25. It an object is determined as a bicycle, the object is determined as an object to be paid attention. Of course, in addition to the bicycle, another object such as a pedestrian may be determined in step S25. If the object is determined as a pedestrian, the object is determined as an object to be paid attention. Further, in step S25, a process for determining whether an object is an artificial structure may be performed. If an object is determined as an artificial structure, the object may be determined as not being paid attention. Processes for determining a pedestrian and an artificial structure may be implemented by any appropriate method (for example, such processes are described in Japanese patent publication laid-open No. 2006-185434).

Next, determination of a bicycle existing in front of a vehicle in accordance with one embodiment of the present invention will be described. Prior to discussing a specific determination method, a principle of the bicycle determination will be described referring to FIG. 8.

Figure 8A:
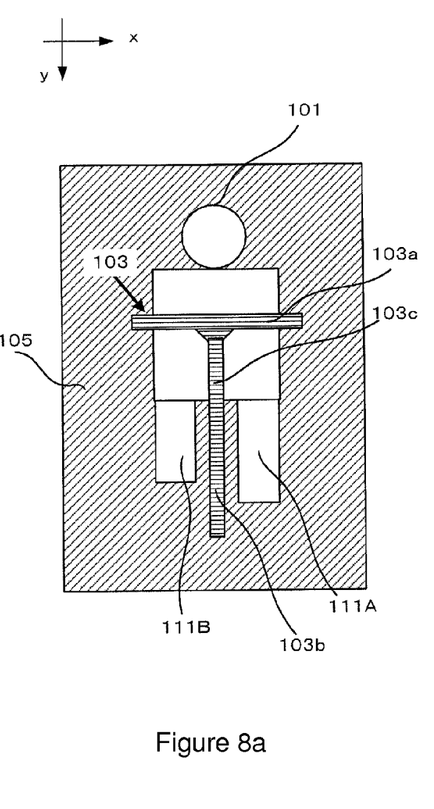
FIG. 8 is a diagram for showing a principle of determining a bicycle in accordance with one embodiment of the present invention.
Figure 8B:
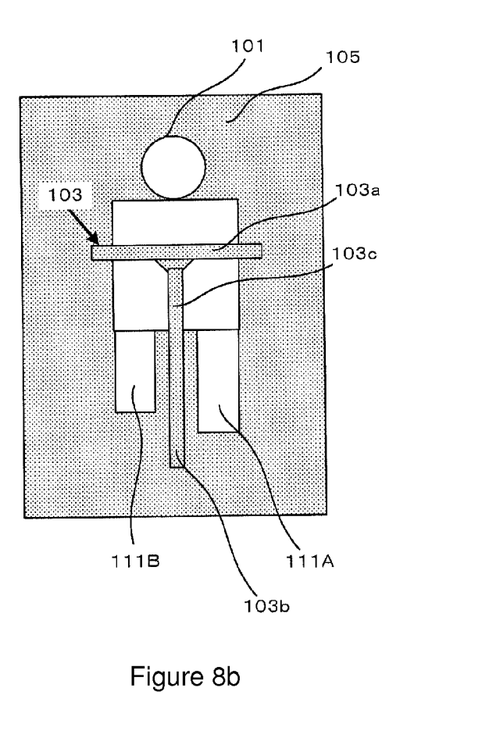

FIG. 8 schematically shows (a) a gray scale image obtained (in step S13 of FIG. 3) by capturing a bicycle operated by a driver and (b) a binary image obtained (in step S14 of FIG. 3) by binarizing the gray scale image. In the gray scale image, levels (shades) of gray are represented by various kinds of hatching. In the binary image, the hatched region indicates a black region. In this embodiment, a bicycle which a driver operates in such a manner as to face with the vehicle is determined.

The driver 101 operating the bicycle 103 with both legs 111A and 111B has a higher temperature and hence is imaged as an image region having higher luminance values in the gray scale image. A background (including a road surface) 105 has a lower temperature and hence is imaged as an image region having lower luminance values in the gray scale image.

The bicycle 103 includes a handle 103a extending in the horizontal direction (x direction), a tire 103b extending in the vertical direction (y direction) between the both legs, and a frame 103c between the handle and the tire. Here, the tire 103b has a lower temperature than that of the driver 101 and that of the background 105. Therefore, at least the tire portion 103b in the bicycle 103 is imaged as an image region having luminance values lower than luminance values of the driver 101 and luminance values of the background 105. Furthermore, because the tire 103b of the bicycle is always in contact with the road surface and the temperature of the road surface can be considered as almost uniform, an image region corresponding to the road surface can be considered as having almost uniform luminance values.

In the binary image, the driver 101 is extracted as a white region. The background 105 is represented by a black region. Because the temperature of the tire portion 103b of the bicycle 103 is lower than the background 105, the tire portion 103b is represented by a black region. In this embodiment, although the other portions of the bicycle 103 except the tire 103b are represented by black regions, these portions may be extracted as white regions depending on the value of the threshold ITH used for the binarization process.

As seen referring to (a) and (b), when a bicycle operated by a driver is captured, regions 111A and 111B of the both legs of the driver 101 are imaged as a pair of vertically-oriented image regions spaced by a width of the body of the driver from each other (the pair of image regions are indicated by reference numerals 111A and 111B used for the both legs, hereinafter). Between the pair of image regions 111A and 111B, an image region representing the tire 103b of the bicycle 103 extends in the vertical direction.

The present invention is made based on this findings. If a pair of vertically-oriented (that is, the length in the vertical direction is greater than the width in the horizontal direction) image regions 111A and 111B that sandwiches an image portion regarded as the tire 103b and are spaced from each other in the horizontal direction is detected, it is determined that an object is a bicycle operated by a driver.

Figure 9:
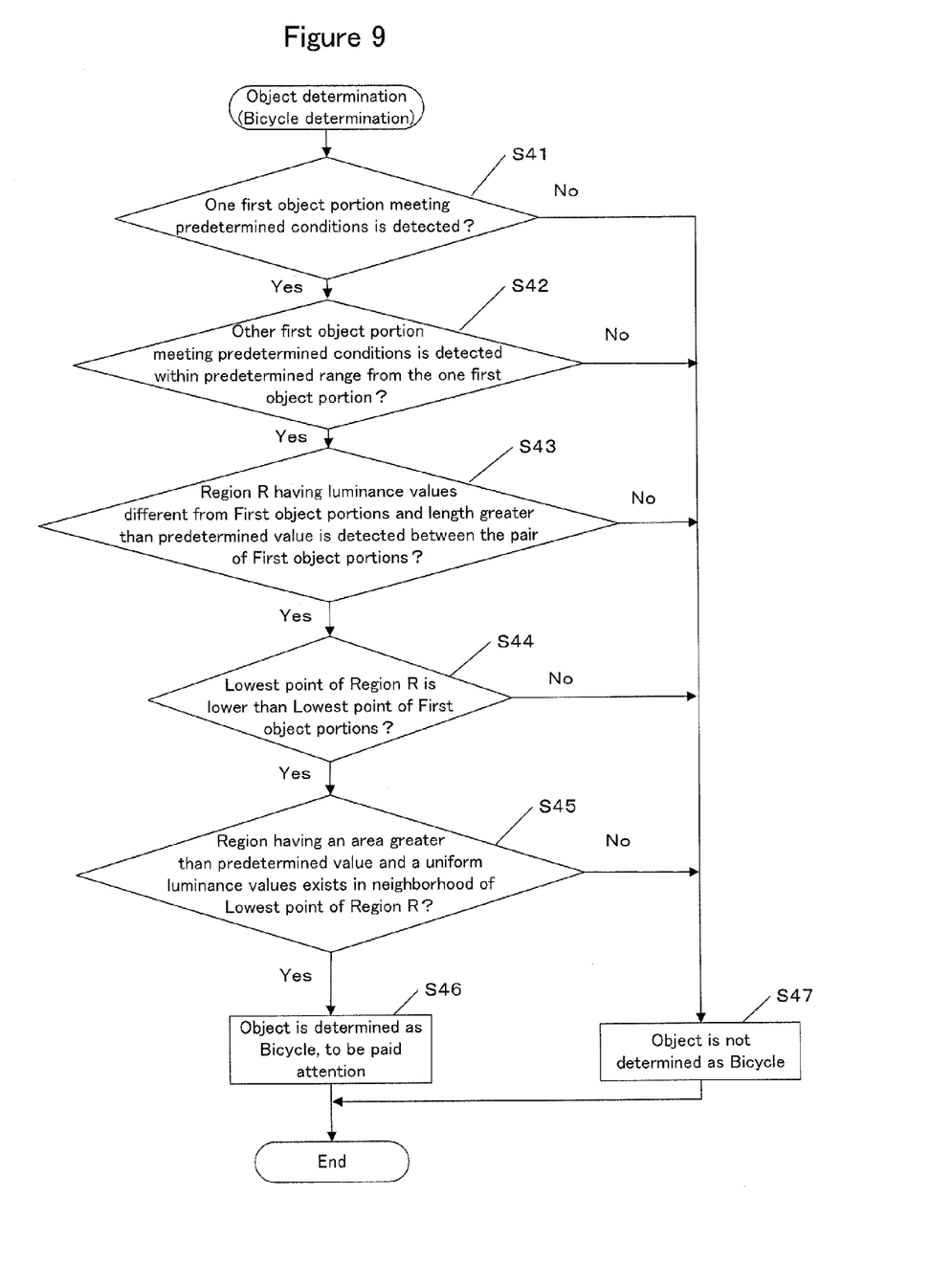
FIG. 9 is a flowchart of a process for determining a bicycle in accordance with one embodiment of the present invention.

FIG. 9 shows a flowchart of a process for determining a bicycle based on the above findings, which is performed in step S25 of FIG. 3. This determination process will be described referring to FIG. 10.

Figure 10A:
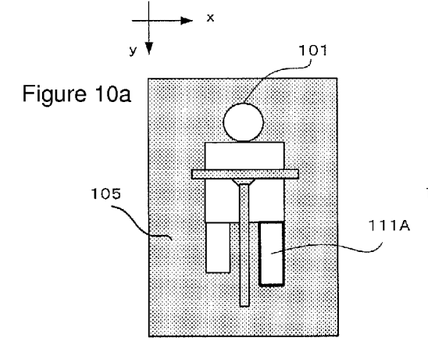
FIG. 10 is a diagram for explaining a bicycle determination process in accordance with one embodiment of the present invention.

In step S41, from the captured image, an image region (image region 111A of FIG. 10(a) in this example) that meets the following conditions 1) and 2) is detected as representing one of the both legs (one of the pair of first objection portions) of the driver.

1) having luminance values that are higher than the luminance value of the background by a predetermined value or more, and 2) being a vertically-oriented region.

The above condition 1) can be implemented by setting the threshold value ITH to a value greater than the background luminance value by a predetermined value or more in the above-mentioned binarization process (step S14 of FIG. 3). This conditions is set for distinguishing and extracting an object having a higher temperature such as a driver 101 from the background (including the road surface) 105. By performing the binarization process using the threshold value ITH thus set in step S14, one or more image regions (white regions) thus extracted includes an image region corresponding to the driver.

Here, the luminance value of the background may be previously set through a simulation or the like. Or, a luminance value having the highest frequency in the histogram of luminance values of the captured gray scale image may be used as the luminance value of the background. This is because the background is generally imaged as having the largest area in the captured image. Furthermore, the above predetermined value may be previously set through a simulation or the like. For example, a well known "mode method" is utilized to determine the predetermined value such that the threshold value ITH is set between a peak indicating the background and a peak indicating a higher temperature object in the histogram of luminance values (a detail method thereof is described in, for example, Japanese patent publication laid-open 2003-216949).

The above condition 2) is based on the findings that the legs operating the bicycle are imaged as vertically-oriented image regions as described referring to FIG. 8. If the width in the horizontal direction (x direction) is greater than the length in the vertical direction (y direction), this condition is met.

In order to improve the detection accuracy, additional conditions 3) through 5) are established in this embodiment. In step S41, an image region that meets not only the conditions 1), 2) but also 3) to 5) is detected in the captured image.

3) having a length equal to or less than a predetermined value in the vertical direction;

4) having a width within a predetermined range in the horizontal direction; and 5) having a linearity in the vertical direction.

The predetermined value in the above condition 3) is previously set according to a height of the leg portion (portion from the waist down) of a general pedestrian (for example, may be set according to standard body measurements for adult). Because the driver operates a bicycle while bending his knees, the length of the imaged leg portion is less than the length of the leg of a walking human. The above condition 3) is set based on this findings.

The predetermined range in the above condition 4) is previously set according to a width of the leg portion of a general pedestrian (for example, may be set according to standard body measurements for adult). For example, it may be set by adding a predetermined margin value to the width of the knee based on standard body measurements for adult. This condition enables the legs of the driver to be distinguished and extracted from the body portion above the legs.

The above condition 5) is set based on the findings that the outline of the leg of the driver operating the bicycle is almost vertical to the road surface. As shown in FIG. 8, each of the image regions corresponding to the legs has a rectangle shape, and edges of the rectangle, parallel with the y axis, represent the outline of the legs, as shown by the image regions 111A and 111B. By examining these edges or vertical edges of the rectangle, the linearity can be examined.

The above five conditions can be determined by any appropriate technique. As one example, this technique will be described. The gray scale image that meets the above condition 1) is binarized as indicated in step S14 of FIG. 3. As described referring to FIG. 4, an image region of an object extracted by the binarization is encoded into run length data. Therefore, by examining the run length in the width direction (x direction), a region having a width within a predetermined range is detected from the image region of the extracted object. Further, the extent to which the region having the width continues in the y direction is examined. If the length in the y direction of the region having the width is greater than the width and is equal to or less than a predetermined value, this region is extracted. Thus, a slope of the vertical edge of the extracted region (for example, pixels on the left edge and (or) the right edge of the extracted region) with respect to the y axis is calculated. If the magnitude of the slope is equal to or less than a predetermined value, the extracted region is determined as having a linearity.

Figure 5B:
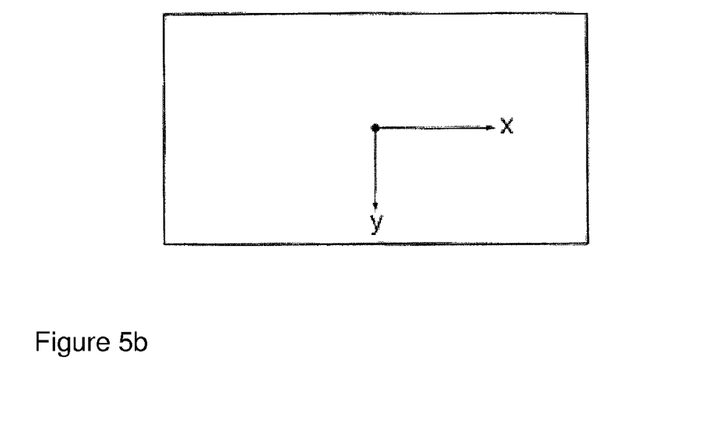

The above comparisons with the predetermined value and the predetermined range in the above conditions 3) and 4) may be performed in the image coordinate system (FIG. 5(b)) or in the real space coordinate system (FIG. 5(a)). This is true for the subsequent steps. In this embodiment, the former is employed. Therefore, the predetermined value and the predetermined range in the above 3) and 4) conditions are values in the image coordinate system, which are obtained by converting the corresponding values in the real space coordinate system to the image coordinate system according to the distance value z in the image region of the object (conversion can be made based on the above equation (3)). Further, if the vehicle turns, the conversion based on the equation (3) may be performed after the correction is made based on the turn angle of the vehicle according to the equation (4).

On the other hand, in the latter case, the predetermined value and the predetermined range in the above conditions 3) and 4) are set to values corresponding to a height of the leg portion of a pedestrian from the road surface and a width of the leg portion, respectively, as described above. The length in the y direction and the width in the x direction (which are expressed in terms of the number of pixels) in the image region of the object are converted to a length in the Y direction and a width in the X direction in the real space coordinate system, which are then compared with the predetermined value and predetermined range, respectively. In this case, the turn angle correction based on the equation (4) may be also performed.

Thus, one leg (one of the first object portions) of the driver is distinguished from the background and the other portions of the bicycle, and detected as the image region 111A. If the one of the first objection portions is detected, the process proceeds to step S42.

Figure 10B:
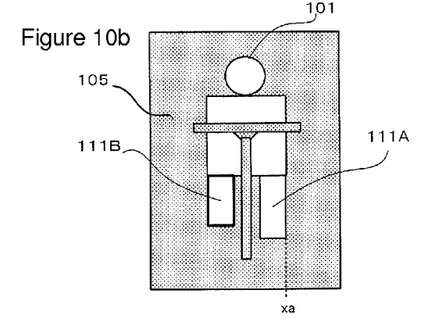

In step S42, it is determined whether an image region that meets the above 1) through 5) conditions in a predetermined range from the image region 111A detected in step S41 in the horizontal direction (x direction) is detected. This is a process for detecting the image region 111B of the other leg (the other of the first object portions) of the driver as shown in FIG. 10(b).

Here, the predetermined range in the horizontal direction is previously set according to the width of the body of a general pedestrian (for example, may be set according to standard body measurements for adult). That is, it can be considered that one leg and the other leg are spaced from each other by a distance corresponding to the width of the body, which is utilized to detect the image region 111B.

The image region 111B can be detected by any appropriate manner. For example, a predetermined range in the x direction (both left and right directions) from an x coordinate value xa (which may be, for example, an average value of pixels constituting the right edge of the image region 111A) on the right edge of the image region 111A is examined in the binary image that satisfies the condition 1) as shown in FIG. 10(b), and it is determined whether the image region that meets the above conditions 2) to 5) is detected in a similar way to step S41.

As a condition for detecting the image region 111B, a condition of having an overlap in the vertical direction (y direction) with the image region 111A may be used, in addition to the above-mentioned condition of existing within the predetermined range in the horizontal direction from the image region 111A. This is because both the legs should be detected in almost the same range in the vertical direction.

Thus, if the other leg portion (the other of the first object portions) is detected as the image region 111B as shown in FIG. 10(b), the process proceeds to step S43.

In this embodiment, in order to improve the detection accuracy, all the conditions 3) to 5) as described above are used. However, any one or more of the conditions 3) to 5) may be used. It is preferable that conditions to be used are the same between steps S41 and S42.

Figure 10C:
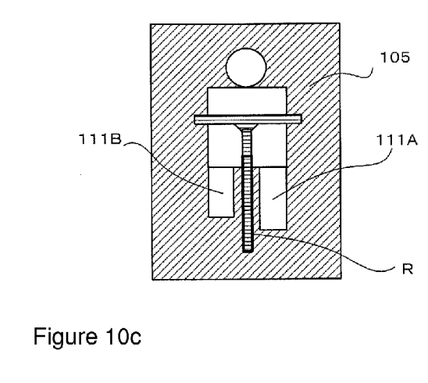

In step S43, as shown in FIG. 10(c), it is determined whether an image region R that has luminance values different from the pair of the first object portions and has a length in the vertical direction longer than a predetermined value exists between the pair of the first object portions detected in steps S41 and S42. This is a process for examining whether a portion that can be regarded as the tire 103b of the bicycle (FIG. 8, referred to as a second object portion) exits between the both legs of the driver. If there is the image region R, it can be determined that a portion that can be regarded as the tire 103b exists. Therefore, an object consisting of the image region R and the pair of the image regions 111A and 111B can be regarded as a bicycle.

In this embodiment, in order to improve the detection accuracy, the image region R having luminance values lower than the luminance value of the background 105. This is based on the findings that the temperature of the tire 103b is lower than the temperature of the background 105, as described referring to FIG. 8. This condition enables the image region R corresponding to the tire 103b to be more distinguishably extracted from the background.

This process is performed on the gray scale image. An example of a specific process will be described. Luminance values in a region between the pair of the image regions 111A and 111B are examined to extract an image region having luminance values lower than the luminance value of the background 105 as described above. The length in the y direction of the extracted region is examined. If the length is equal to or greater than a predetermined value, it is determined that the image region R representing the tire portion is detected. Here, for example, the predetermined value may be set according to a height of a top of the tire of the bicycle from the road surface with the assumption of the dimensions of a general bicycle.

Thus, the region R that can be regarded as the tire 103b of the bicycle is extracted as shown by the bold frame in FIG. 10(c).

In order to improve the determination accuracy of the bicycle, this embodiment further provides steps S44 and S45, where a determination considering the road surface 107 is made.

In step S44, it is determined whether a lowest point in the vertical direction of the region R is lower than a lowest point in the vertical direction of the image region 111A and a lowest point in the vertical direction of the image region 111B. This is based on the findings that, if the region R represents the tire, the bottom edge of the region R should exist at a position lower than the bottom edges of the image regions 111A and 111B of the both legs because the tire is in contact with the road surface. Here, the lowest point indicates a lowest position in the vertical direction of the captured image.

Figure 10D:
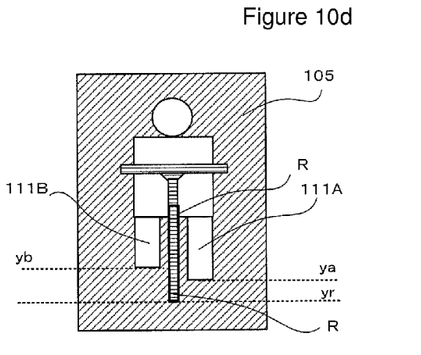

An example of a specific process will be described. In this embodiment, the xy coordinate system is established such that the y coordinate value increases toward a lower place in the captured image as shown in FIG. 5(b). Therefore, the "lowest point" corresponds to a point having a maximum y coordinate value. Among pixels in the bottom edge of the region R, a pixel having a maximum y coordinate value is selected (as shown in FIG. 10(d), y coordinate value is yr). Similarly, among pixels in the bottom edge of the image region 111A, a pixel having a maximum y coordinate value is selected (y coordinate value is ya). Among pixels in the bottom edge of the image region 111B, a pixel having a maximum y coordinate value is selected (y coordinate value is yb).

If yr>ya and yr>yb, the decision of step S44 is Yes, and the process proceeds to step S45. Alternatively, the comparison may be made with an average value of y coordinate values of pixels included in the bottom edge.

In step S45, it is determined whether an image region having an area greater than a predetermined value and having uniform luminance values exists in the neighborhood of the lowest point of the region R. This is based on the findings that an image region S of the road surface where the luminance value is relatively uniform should spread in the neighborhood of the lowest point of the tire.

Figure 10E:
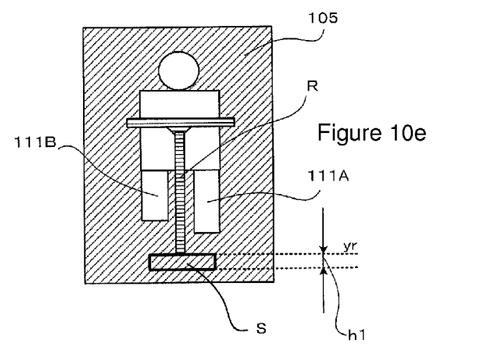

An example of a specific process will be described. As shown in FIG. 10(e), luminance values in a region between a bottom edge (y coordinate value is yr) of the region R and a position blow the bottom edge by a predetermined value h1 in the gray scale image are examined. The predetermined value h1 may be set to a value corresponding to a few centimeters in the real space coordinate system. A range in the x direction to be examined for luminance values may be arbitrarily determined. If pixels having luminance values within a predetermined range are detected over an area having a predetermined value or more in the examined region, it is determined that an image region S having uniform luminance values or representing the road surface exists. Here, the magnitude of the predetermined range is established such that luminance values included in the range can be regarded as being uniform.

Figure 10F:
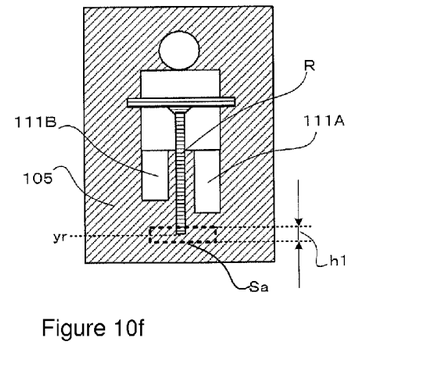

Alternatively, because the road surface may be imaged such that it spreads upward in the y direction with respect to the lowest point (y coordinate value is yr) of the region R, the predetermined value h1 may be set in such a manner as to surround a lower edge portion of the region R, as shown by a region Sa surrounding by a dotted line of FIG. 10(f). Therefore, the term "neighborhood of the lowest point" is used with an intention of possibly including not only a portion below the lowest point but also a portion above the lowest point.

As described above, because the temperature of the tire is lower than the temperature of the background, an additional condition that the image region S has luminance values lower than the luminance value of the background may be used when determining whether the image region S representing the road surface exists.

Thus, if all the decisions of steps S41 through S45 are Yes, it is determined that an object having the pair of the first object portions (image regions 111A and 111B) and the second object portion (image region R) is a bicycle and hence to be paid attention (S46). If any one of the decisions of steps S41 through S45 is No, it is determined that an object is not a bicycle (S47). If it is determined that an object is not a bicycle, it may be determined whether the object is a pedestrian or not by another method.

As described above, if it is determined as a bicycle, it is determined whether a warning should be actually issued in a warning determination process in step S26 of FIG. 3. This determination process will be described.

In this embodiment, it is determined from an output of the brake sensor 7 whether a driver is carrying out a brake operation or not. If the driver is not carrying out a brake operation, the warning output is made. If the driver is carrying out a brake operation, a deceleration Gs (expressed as a positive value) generated by the brake operation is calculated. When the deceleration Gs is equal to or less than a threshold value GTH (Gs≤GTH), the warning output is made. When Gs>GTH, it is determined that a collision can be avoided by the brake operation, and hence the process exits. Thus, when an appropriate brake operation is being performed, the warning is prevented from being issued, thereby preventing a driver from being annoyed by unnecessary warnings. However, alternatively, the warning may be issued without determining for the brake operation.

Here, the threshold value GTH can be defined as shown by the equation (10). This indicates a value corresponding to a condition for stopping the vehicle 10 in a travel distance equal to or less than the distance Zv(0) assuming that the deceleration Gs generated by the brake operation is maintained.

$$GTH = \frac{Vs^2}{2 \times Zv(0)} \tag{10}$$

Figure 11:
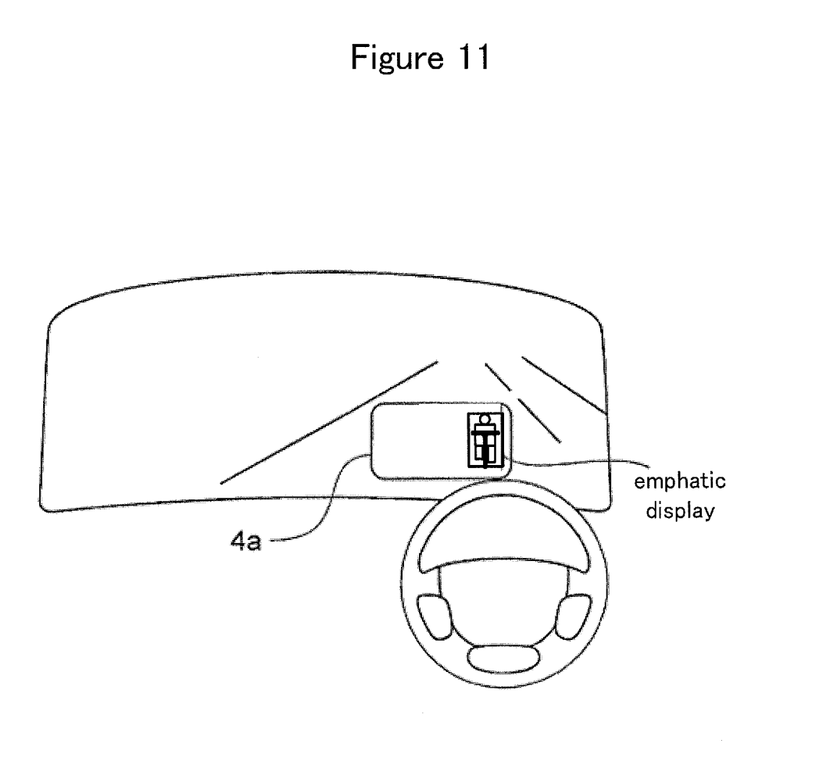
FIG. 11 is a diagram for explaining one example of a warning output in accordance with one embodiment of the present invention.

In the warning output, a voice alarm is generated by the speaker 3, and as shown in FIG. 11, an image obtained by, for example, the camera 1R is displayed on the screen 4a of the HUD 4 such that the bicycle is emphatically displayed. The emphatic display may be implemented by any method. For example, the emphatic display is made by enclosing an object by a colored frame. Any one of the alarm voice and the emphatic display may be used for the warning output. Thus, a driver can more surely recognize a moving object that has a higher possibility of collision.

According to the present invention, a bicycle is determined based on whether a shape of the both legs of a driver, a shape of a bicycle and a placement relationship between both the shapes are extracted from a single captured image. Therefore, tracking captured images in time series is not required for determining a bicycle. A bicycle can be determined while reducing time and computational load required for the image processing.

However, the tracking may be used in the bicycle determination in an alternative embodiment. For example, the bicycle determination as described above is made for each of captured images. If the bicycle is determined over a predetermined number of continuous images, a final determination that the object is a bicycle is made. In response to this, the above process for attracting attention of a driver may be performed.

In the above embodiments, a relative movement vector is calculated in steps S23 and S24 of FIG. 3 to determine an object having a possibility of collision, and the object determination process for the object thus determined is performed in step S25. However, the bicycle determination process of FIG. 9 may be performed, for example, following the run length conversion of step S17 of FIG. 3, without calculating the relative movement vector and determining a possibility of collision. Further, the process of steps S41 and S42 may be performed by directly extracting from the gray scale image an image region that meets the condition 1) in step S41 of FIG. 9. In this case, the bicycle determination process of FIG. 9 may be performed following the acquisition of the gray scale image in step S13 of FIG. 3.

In the above embodiments, a bicycle operated by a driver in such a manner as to face with the vehicle 10 is determined. In this determination, a case where a driver rides the bicycle, but the bicycle is standing still is included. When the bicycle is standing still, it can be considered that at least one leg is in contact with the road surface as with the tire. Even in this case, the both legs portion can be extracted to meet the conditions as described referred to step S41. Because the tire portion of the bicycle is imaged to extend in the vertical direction between the both legs, the image region R having a length greater than a predetermined value in the vertical direction can be detected.

Further, even for a bicycle that is traveling or standing still by a driver with his/her back to the vehicle, the present invention is applicable because the tire (rear wheel) is imaged between the both legs of the driver.

The present invention is not limited to the above embodiments. Various modifications are possible. For example, in the above embodiments, an infrared camera is used as an image capturing means. Alternatively, a general camera that can detect only visible lights may be used (for example, Japanese patent publication laid-open No. H02-26490). However, by using an infrared camera, an extraction process of an object can be simplified, and a load of calculations can be reduced.

The present invention should not be limited to the foregoing description of the embodiments and may be taken into practice by adding various modifications to the foregoing embodiments without departing from the gist of the invention.

The invention claimed is:

1. A vehicle periphery monitoring apparatus, mounted on a vehicle, for recognizing a bicycle operated by a driver around the vehicle, comprising:
   an image capturing mechanism which captures an image around the vehicle to obtain a captured image having luminance values according to temperatures of an object;
   an extracting mechanism which extracts, from the captured image, an image region having luminance values indicating temperatures greater than a temperature of a background by a predetermined value;
   a bicycle determination mechanism configured to:
      determine whether a pair of first object portions each having a length in the vertical direction greater than a width in the horizontal direction is detected from the extracted image region;
      determine, if the pair of first object portions is detected, whether a distance between one of the first object portion and the other of the first object portion being less than a predetermined value;
      determine, if the distance is less than the predetermined value, whether a second object portion having luminance values different from the first object portions and having a length in the vertical direction greater than a predetermined value exists between the pair of the first object portion is detected from the extracted image region; and
      determine, if the second object portion is detected, an object including the pair of the first object portions and the second object portion as a bicycle.

2. The vehicle periphery monitoring apparatus of claim 1, wherein the bicycle determination mechanism determines the object including the pair of the first object portions and the second object portion as a bicycle if the second object portion has luminance values indicating temperatures lower than the temperature of the background.

3. The vehicle periphery monitoring apparatus of claim 1, wherein the bicycle determination mechanism determines the object as a bicycle if it is detected that a position of a lowest point of the second object portion is lower than a position of a lowest point of the pair of the first object portions in the vertical direction.

4. The vehicle periphery monitoring apparatus of claim 1, wherein the bicycle determination mechanism determines the object as a bicycle if an image region having an area greater than a predetermined value and having a uniform luminance is detected in a neighborhood of a lowest point of the second object portion.

5. The vehicle periphery monitoring apparatus of claim 2, wherein the bicycle determination mechanism determines the object as a bicycle if it is detected that a position of a lowest point of the second object portion is lower than a position of a lowest point of the pair of the first object portions in the vertical direction.

6. The vehicle periphery monitoring apparatus of claim 2, wherein the bicycle determination mechanism determines the object as a bicycle if an image region having an area greater than a predetermined value and having a uniform luminance is detected in a neighborhood of a lowest point of the second object portion.

7. The vehicle periphery monitoring apparatus of claim 3, wherein the bicycle determination mechanism determines the object as a bicycle if an image region having an area greater than a predetermined value and having a uniform luminance is detected in a neighborhood of a lowest point of the second object portion.

8. The vehicle periphery monitoring apparatus of claim 5, wherein the bicycle determination mechanism determines the object as a bicycle if an image region having an area greater than a predetermined value and having a uniform luminance is detected in a neighborhood of a lowest point of the second object portion.

9. The vehicle periphery monitoring apparatus of claim 1, wherein the presence of the first and the second object portions are determined on the basis of sizes of each part of the object measured along the horizontal and the vertical directions in the captured image.

10. A vehicle periphery monitoring method for recognizing a bicycle operated by a driver around the vehicle, comprising:
   capturing an image around the vehicle with an image capturing mechanism to obtain a captured image having luminance values according to temperatures of an object;

extracting, from the captured image using an extracting mechanism, an image region having luminance values indicating temperatures greater than a temperature of a background by a predetermined value;

detecting a pair of first object portions each having a length in the vertical direction greater than a width in the horizontal direction in the extracted image region;

subsequent to the detecting of the pair of first object portions, detecting a distance between one of the first object portion and the other of the first object portion to be less than a predetermined value;

subsequent to detecting that the distance is less than the predetermined value, detecting a second object portion having luminance values different from the first object portions and having a length in the vertical direction greater than a predetermined value between the pair of the first object portion; and subsequent to detecting the second object portion, determining the object including the pair of the first object portions and the second object portion to be a bicycle.

11. The vehicle periphery monitoring method of claim 10, further comprising:

determining that the second object portion has luminance values indicating temperatures lower than the temperature of the background.

12. The vehicle periphery monitoring method of claim 10, further comprising:

determining that a position of a lowest point of the second object portion is lower than a position of a lowest point of the pair of the first object portions in the vertical direction.

13. The vehicle periphery monitoring method of claim 10, further comprising:

determining the image region to have an area greater than a predetermined value and detecting a uniform luminance in a neighborhood of a lowest point of the second object portion.

14. The vehicle periphery monitoring method of claim 11, further comprising:

determining that a position of a lowest point of the second object portion is lower than a position of a lowest point of the pair of the first object portions in the vertical direction.

15. The vehicle periphery monitoring method of claim 11, further comprising:

determining the image region to have an area greater than a predetermined value and detecting a uniform luminance in a neighborhood of a lowest point of the second object portion.

16. The vehicle periphery monitoring method of claim 12, further comprising:

determining the image region to have an area greater than a predetermined value and detecting a uniform luminance in a neighborhood of a lowest point of the second object portion.

17. The vehicle periphery monitoring method of claim 14, further comprising:

determining the image region to have an area greater than a predetermined value and detecting a uniform luminance in a neighborhood of a lowest point of the second object portion.

18. The vehicle periphery monitoring method of claim 10, wherein the presence of the first and the second object portions are detected on the basis of sizes of each part of the object measured along the horizontal and the vertical directions in the captured image.

* * * * *